(12) United States Patent
Bartos et al.

(10) Patent No.: US 9,297,634 B2
(45) Date of Patent: Mar. 29, 2016

(54) DEVICE FOR GENERATING A SENSOR SIGNAL AND METHOD FOR DETERMINING THE POSITION OF A SENSOR

(75) Inventors: Axel Bartos, Waltrop (DE); Reinhold Pieper, Lüdinghausen (DE); Francois Limouzineau, Dortmund (DE); Andreas Voss, Dortmund (DE); Armin Meisenberg, Dortmund (DE)

(73) Assignee: MEAS DEUTSCHLAND GMBH, Dortmund (DE)

( * ) Notice: Subject to any disclaimer, the term of this patent is extended or adjusted under 35 U.S.C. 154(b) by 540 days.

(21) Appl. No.: 13/805,972

(22) PCT Filed: Jun. 17, 2011

(86) PCT No.: PCT/EP2011/003013
§ 371 (c)(1),
(2), (4) Date: Apr. 2, 2013

(87) PCT Pub. No.: WO2011/160796
PCT Pub. Date: Dec. 29, 2011

(65) Prior Publication Data
US 2013/0200887 A1  Aug. 8, 2013

(30) Foreign Application Priority Data
Jun. 25, 2010 (DE) .......... 10 2010 025 170

(51) Int. Cl.
*G01B 7/14* (2006.01)
*G01D 5/14* (2006.01)
(52) U.S. Cl.
CPC . *G01B 7/14* (2013.01); *G01D 5/145* (2013.01)
(58) Field of Classification Search
CPC ...... G01D 5/145; G01R 33/022; G01R 33/06; G01R 33/02; G01B 7/003; G01B 7/004; G01B 7/14; G01B 7/028; G01B 7/30; H01L 43/06; G01P 3/66

USPC .......... 324/252, 179, 207.2, 207.21, 207.22, 324/207.24, 259, 206, 174
See application file for complete search history.

(56) References Cited

U.S. PATENT DOCUMENTS

| 5,142,225 A * | 8/1992 | Gerlach ................. | G01D 5/246 324/207.12 |
| 6,366,079 B1 * | 4/2002 | Uenoyama ............ | G01D 5/147 324/207.21 |

(Continued)

FOREIGN PATENT DOCUMENTS

| DE | 68921630 T2 | 9/1995 |
| DE | 10118650 A1 | 10/2002 |

(Continued)

OTHER PUBLICATIONS

Bartos, Alex, "Magnetische Messverfahren am Beispiel des AMR Sensors", Article, 23 pages.

(Continued)

*Primary Examiner* — Tung X Nguyen
*Assistant Examiner* — Thang Le
(74) *Attorney, Agent, or Firm* — Howard IP Law Group (57) ABSTRACT

The invention relates to a device for generating a sensor signal, the profile thereof depending on the position of a magnetic field-generating element relative to the device, with at least two magnetically sensitive sensors disposed along a measurement path, wherein a support field device, which generates a magnetic support field in the magnetically sensitive sensors, has at least in the magnetically sensitive sensors an essentially identical direction and an essentially homogeneous field strength.

12 Claims, 7 Drawing Sheets

(56) References Cited

U.S. PATENT DOCUMENTS

| | | | |
|---|---|---|---|
| 6,956,366 B2* | 10/2005 | Butzmann | 324/207.21 |
| 7,535,215 B2* | 5/2009 | Forster | G01D 5/145 324/165 |
| 8,368,388 B2* | 2/2013 | Lohberg | G01D 5/24438 324/174 |
| 2002/0149358 A1 | 10/2002 | Doescher | |
| 2003/0030431 A1* | 2/2003 | Reininger | 324/207.2 |
| 2010/0114518 A1* | 5/2010 | Lindberg et al. | 702/94 |
| 2010/0141244 A1* | 6/2010 | Bartos | G01D 5/12 324/207.21 |
| 2011/0109252 A1* | 5/2011 | Takagi | H02K 41/03 318/135 |
| 2011/0148408 A1 | 6/2011 | Meisenberg et al. | |
| 2014/0253106 A1* | 9/2014 | Granig et al. | 324/207.14 |

FOREIGN PATENT DOCUMENTS

| | | |
|---|---|---|
| DE | 102005039280 A1 | 2/2007 |
| DE | 102006019482 A1 | 10/2007 |
| DE | 102007008870 A1 | 9/2008 |
| DE | 102008015861 A1 | 10/2009 |
| DE | 102008033579 A1 | 1/2010 |
| EP | 1249686 A1 | 4/2002 |
| EP | 1701176 A1 | 2/2006 |
| EP | 1910780 B1 | 6/2009 |
| WO | 2007/014947 A1 | 2/2007 |
| WO | 2010/006801 A1 | 1/2010 |

OTHER PUBLICATIONS

Bartos, Alex, "Magnetic measurement method using the example of the AMR sensor", Article, 27 pages. (English translation of Item No. 1).

International Search Report dated Jul. 18, 2012 for counterpart International Application No. PCT/EP2011/003013.

* cited by examiner

DEVICE FOR GENERATING A SENSOR SIGNAL AND METHOD FOR DETERMINING THE POSITION OF A SENSOR

CROSS REFERENCE TO RELATED APPLICATIONS

This application is the national stage application under 35 U.S.C. §371 of International Application No. PCT/EP2011/003013 and claims the benefit of International Application No. PCT/EP2011/003013, filed Jun. 17, 2011, and German Application No. 10 2010 025 170.4-52, filed Jun. 25, 2010, the entire disclosures of which are incorporated herein by reference in their entireties.

FIELD OF THE INVENTION

The invention relates to a device for generating a sensor signal, the temporal progression of which depends on the position of a magnetic field-generating element relative to the device, and having at least two magnetic field-sensitive sensors disposed along a measurement path. The invention also relates to a method for determining the position of an element. The invention also relates to a device having a magnetic field-generating element and a device for generating a sensor signal.

BACKGROUND

In a variety of technical fields, there is a need to determine the position of a first movable component of a device relative to a second component that is, for the most part, stationary. Thus, in a pipeline system with valves for example, it is of interest to determine the position of a valve body of a valve relative to the valve housing thereof, for example, in order to determine whether the valve is open or closed, or in order to determine how wide the valve is open. Likewise, it is also of interest to determine the position of a piston in a cylinder. There is frequently an interest to determine the absolute position of a first movable component relative to a second component, which is stationary for the most part, in reference to a fixed coordinate system of the second component. It is also frequently of interest to determine when the first movable component passes a specific position.

A device is known from the document DE 32 44 891 C2, in which several magnetically sensitive sensors are disposed along a measurement path. The output signals of the sensors are supplied to a multiplexer. The output of the multiplexer is supplied to evaluation electronics that from the multiplexer output signal generate a signal, and from this signal the position of a magnetic field-generating element relative to the sensors can be determined.

The document EP 1 209 439 B1 describes, in addition to a design comparable to DE 32 44 891 C2, an evaluation method that can evaluate the output signal of the multiplexer.

In industrial automation, it is standard to determine the piston position in pneumatic compressed air cylinders using magnetic sensors. In addition to microwaves, differential transformers (LVDT) and inductive sensor solutions (EP 0 693 673 A2), silicon-based magnetic sensors such as Hall sensors (EP 1 264 159 B1) and magnetoresistive sensors (DE 32 44 891 C2) are predominantly used as displacement transducers. Depending on the task, these devices are present as individual sensors for determining a switch point, or as an array of sensors for determining multiple switch points or absolute positions.

For this purpose, the piston is supplied with a position sensor. Typically, this is an annular magnet, the outer diameter of which corresponds approximately to the maximum diameter of the piston. Or this can be a substantially smaller disc magnet integrated at a location in the piston which is alongside a specific outer groove in the cylinder. The smaller, or respectively weaker, the magnets that are used, the smaller the danger of contamination due to magnetic chips on the one hand; on the other hand, magnetic interference fields gain greater influence on the measurement accuracy. The various types of the cylinders typically use different position sensors.

In the simplest case, when a magnet passes a displacement transducer, a sensor signal is generated that generates a switching signal with a predefined reference value in downstream electronics. Frequently it is desirable to subdivide the automated procedure into several steps, corresponding to which several switching points are required. In order to reduce the assembly complexity, it is not desirable to assemble several sensor switches for each switching point, but rather to have the displacement transducer perform this task. The measurement of an absolute position of the piston is even more advantageous. The corresponding switching points are then mapped in a downstream stored program control.

With the use of magnetoresistive sensors, which utilize the anisotropic magnetoresistance affect (AMR), it must be noted that with external fields that are too weak, as can occur with a remote element position, a reversal of magnetization procedures can occur in the active meanders, which leads to undefined sensor signals. For this reason, the document EP 0 783 666 B1 discusses a magnet which generates a magnetic field of sufficient strength in order to saturate the magnetoresistive material.

Based on this background, the problem addressed by the invention is to provide a device for generating a sensor signal and a method for determining the position of a magnetic field-generating element relative to a device for generating a sensor signal, with which the position of a magnetic field-generating element relative to a device can be better determined.

SUMMARY

With a device for generating a sensor signal, the progression thereof depending on the position of a magnetic field-generating element relative to the device, with at least two magnetically sensitive sensors disposed along a measurement path, the invention is based on the fundamental idea to provide a support field device wherein the support field device generates a magnetic support field in the magnetically sensitive sensors, that has at least in the magnetically sensitive sensors an essentially identical direction and an essentially homogeneous field strength. It was recognized that it is expedient to use such a support field device for attaining a stable operating state. It was further recognized that the use of such a support field device permits the use of magnetic field-generating elements which generate a magnetic field with weak field strength.

In a preferred embodiment, magnetoresistive sensors are used as magnetic field-sensitive sensors. In a particularly preferred embodiment, AMR sensors (anisotropic magnetoresistive sensors) are used with barber poles. The support field generated by the support field device can be used with such an embodiment for the purpose of ensuring a reliable magnetic saturation of the sensor material at every element position.

Magnetic field-sensitive sensors, particularly magnetoresistive sensors, particularly barber pole sensors, frequently have a characteristic curve progression which, for each field strength of the magnetic field component of a magnetic field generated by a magnetic field-generating element in the sensor, expresses a value of the ratio of the strength of the sensor signal generated by the sensor relative to the maximum sensor signal that can be generated by the sensor, and which is substantially linear only in some parts of a small range of field-strength of the magnetic field components and progresses non-linearly adjacent to the substantially linearly progressing section of the characteristic curve. With the use according to the invention of a support field device, the possibility arises to influence the characteristic curve of the sensor in order to modify the range of field strength of the magnetic field components of the external magnetic field, in which the characteristic curve progresses linearly. Thus, the device according to the invention for generating a sensor signal can be tuned by a suitable selection of the support field device such that with the sensor characteristic curve that would otherwise become non-linear with element signals that are too strong, it makes a characteristic curve progression available that on the one hand, even with the strongest element magnets to be anticipated, the field strength generated thereby in the sensor is still in the substantially linear range of the sensor characteristic curve, and on the other hand, with weaker, farther removed magnets, the characteristic curve progressions are available that can still be properly evaluated. With the use a support field it is also possible to provide of a single design of the device according to the invention that can be used with different elements having different magnetic fields of the element.

In one preferred embodiment, the respective sensor has a full bridge arrangement (Wheatstone bridge) of magnetoresistive elements, or a half bridge circuit of such magnetoresistive elements. In a particularly preferred embodiment, further full bridge circuits, or further half bridge circuits can be provided for each sensor. A suitable design of the magnetic field-sensitive sensors allows two sinusoidal-like and cosinusoidal-like signals to be obtained that depend primarily on the field direction. In this case, as well, the use of a support field device can be provided to ensure a stable operating state, particularly in the absence of element magnets, more remote positioning of the element magnets or a very weak element magnet.

In a preferred embodiment, the magnetic field-sensitive sensors are magnetoresistive sensors. In particular, the respective sensor can have the "anisotropic magnetoresistive effect" (AMR effect) or the "gigantic" magnetoresistive effect (GMR effect). However, the sensor element can also have other effects such as giant magneto impedance (GMI), the tunnel magneto resistive effect (TMR) or the Hall effect, for example.

In a preferred embodiment, the measurement path is a line along which the at least two sensors are disposed. In another, likewise preferred embodiment, the measurement path is an elliptical arch, particularly a circular arc. The measurement path along which the at least two magnetic field-sensitive sensors are disposed can be selected depending on the movement of the magnetic field-generating element, which is intended to interact with the device according to the invention for generating a sensor signal. If the device according to the invention is to be used with a magnetic field-generating element which moves linearly with respect to the device according to the invention, then the measurement path can be designed to be a line. However, if the magnetic field-generating element, with which the device according to the invention is to be used, performs a rotational movement, for example if the device according to the invention is to be used for angular position, then the measurement path can be designed to be an elliptical arc, particularly preferably as a circular arc.

In a preferred embodiment of the device according to the invention and in a preferred embodiment of the method according to the invention, a plurality of sensors, particularly preferably more than 4, especially preferably more than 7, are disposed along the measurement path. If the device according to the invention with a magnetic field-generating element and a device for generating a sensor signal is used to generate a signal when the element reaches a previously specified switching position, then at least two sensor can be disposed in the region of this switching point, particularly disposed symmetrically about the switching point.

The support field device used according to the invention can be composed of one or more component parts, for example permanent magnets. The support field device can also consist of a plurality of components however, as is required for generating magnetic fields by means of electromagnetic coils for example. In a preferred embodiment, the support field device is formed by a multiplicity of permanent magnets wherein at least one permanent magnet, particularly preferably exactly one permanent magnet, is assigned to each sensor. If the sensors with such an embodiment are disposed on a carrier element, for example a printed circuit board, then the permanent magnets can be disposed next to, or opposite, the sensors on the same printed circuit board. Likewise the permanent magnets can be disposed directly on, or beneath, the sensor substrates. The arrangement of the magnets forming the support field device in the proximity of the sensors allows the use of smaller magnets with less expansive fields, whereby in practice problems due to adhering metal impurities can be reduced. In a particularly preferred embodiment, the additional permanent magnets are applied on the printed circuit board in the same soldering step as the sensors and the remaining components. The magnets can be provided with a surface coating in order to improve the soldering procedure or bonding procedure.

In a particularly simple embodiment the support field device is composed of a single magnet magnetized differently in segments.

In a preferred embodiment, the sensors are disposed uniformly along the measurement path. In a particularly preferred embodiment, a support field device is provided, in which permanent magnets are used that are also disposed uniformly.

In order to avoid a deviating magnetic flux density at the sensor location with the respective external sensors of the row of sensors due to the termination of the row of magnets, the respective external magnet can contain a form or position different than that of the internal magnets.

In a preferred embodiment the support field device has permanent magnets that are designed to be identical.

To facilitate handling the magnets during the assembly process, and to ensure correct magnetization of all magnets, this step is performed with unmagnetized magnets that are not magnetized until an additional production step.

In a preferred embodiment, the sensor and the support field device are attached to a carrier element for forming a sensor head. The dimensions of the sensor head in one preferred embodiment are less than 45 mm in the direction of the measurement path, and less than 2.4 mm in a first direction perpendicular to the measurement path, and less than 10 mm in a second direction that is perpendicular to the measurement path and perpendicular to the first direction. Such a design of the device according to the invention makes it possible to use the device in T-grooves or C-grooves, as are frequently implemented in housings of pneumatic cylinders or the like.

In addition, or alternatively, with the device according to the invention for generating a sensor signal, at least one first sensor, particularly preferably all sensors, has a first part that generates a first intermediate signal, and a second part that generates a second intermediate signal, wherein the progression of the first intermediate signal and the progression of the second intermediate signal depend on the direction and/or the strength of an externally generated magnetic field, and that the first intermediate signal has a substantially sinusoidal progression and that the second intermediate signal has a substantially cosinusoidal progression, wherein the center of the first part corresponds to the center of the second part. This arrangement of the first part generating the sinusoidal signal relative to the second part generating the cosinusoidal signal can advantageously allow an instantaneous signal amplitude to be derived from the analysis of the two intermediate signals such that, upon further signal analysis, a selection can be made, and only those signals of the sensors are used which have sufficient signal amplitude, based on selection criteria using the initially determined instantaneous signal amplitude.

A device according to the invention having a magnetic field-generating element and a device for generating a sensor signal, the progression of which depends on the position of a magnetic field-generating element relative to the device, which has at least two magnetically sensitive sensors disposed along a measurement path, and the magnetically sensitive sensors generate the sensor signal or an intermediate signal used for generating the sensor signal, or generate several intermediate signals used for generating the sensor signal, wherein the device for generating a sensor signal has a support field device that generates a magnetic support field in the magnetic field-sensitive sensors, and/or with the device for generating a sensor signal at least one sensor has a first part which generates a first intermediate signal, and has a second part which generates a second intermediate signal, wherein the progression of the first intermediate signal and the progression of the second intermediate signal depend on the direction and/or the strength of an externally generated magnetic field, and the first intermediate signal has a substantially sinusoidal progression and the second intermediate signal has a substantially cosinusoidal final progression, wherein the center of the first part corresponds substantially to the center of the second part. With this device according to the invention having an element and a device for generating a sensor signal, the magnetic field-generating element can be moved relative to the device substantially along a path running in parallel to the measurement path. The movement of the device for generating a sensor signal relative to a stationary, magnetic field-generating element is also understood to be a movement of the magnetic field-generating element relative to the device for generating a sensor signal, as well as the simultaneous movement of the element and the device, however, in this case moving in different directions and/or at different speeds. This device according to the invention having a magnetic field-generating element and a device for generating a sensor signal has the following features:

at least one sensor having a progression of the characteristic curve, with respect to a magnetic field component of a magnetic field applied externally to the sensor without influence of the support field, that for each field strength of the magnetic field component expresses a value of the ratio of the strength of the sensor signal generated by the sensor relative to the maximum sensor signal that can be generated by the sensor, and that in a field strength range of the magnetic field component the progression is substantially linear and progresses non-linearly adjacent to the section of the characteristic curve running substantially linearly, the magnetic field generated by the element, when the element is located at a position along the path in which the element is closest to the sensor, and no support field is present, has a magnetic field component in the sensor with a first field strength that lies outside of the field strength range in which the characteristic curve has a substantially linear region, and the sensor, with respect to a magnetic field component of a magnetic field applied externally to the sensor with the influence of the support field, has a different progression of the characteristic curve, that in a field strength range of the magnetic field component is substantially linear and progresses non-linearly adjacent to the section running substantially linearly, the magnetic field generated by the element, when the element is located at a position along the path in which the element is closest to the sensor, and the support field is present, has a magnetic field component in the sensor with a first field strength that lies within the field strength range in which the other progression of the characteristic curve has a substantially linear region.

Thus, the device according to the invention having the magnetic field-generating element and the device for generating a sensor signal utilizes the fact that, due to the support field, the characteristic curve of at least one sensor, particularly preferably all sensors, can be influenced in such a manner that if the magnetic field component of the magnetic field generated by a predefined element lies within the field strength range of the characteristic curve in which the characteristic curve does not progress linearly, then the support field can hereby cause a change of the characteristic curve so that the characteristic curve changed by the support field has a linearly progressing section in the field strength range of the magnetic field component of the magnetic field generated by the element.

In a preferred embodiment of the device according to the invention having a magnetic field-generating element and a device for generating a sensor signal, the element can be moved along a defined path limited in its extension, and the support field is selected such that the magnetic field generated by the element at every position of the element along the path has a magnetic field component in the sensor having a first field strength that lies within the field strength range in which the progression of the characteristic curve changed by the support field has a substantially linear region.

In a particularly preferred embodiment, with the device according to the invention having a magnetic field-generating element and a device for generating a sensor signal, the device according to the invention described above is used for generating a sensor signal.

The method according to the invention for determining the position of a magnetic field-generating element relative to a device for generating a sensor signal having disposed along a measurement path at least two magnetic field-sensitive sensors which generate the sensor signal or an intermediate signal used for generating the sensor signal, or several intermediate signals used for generating the sensor signal, provides that:

the progression of the sensor signal that is generated when the element is located in the position to be determined is compared in an evaluation unit to a reference progression stored in the evaluation unit, wherein the reference progression expresses the progression of a sensor signal generated with the device, which was generated when the element was located in a reference position relative to the device or the reference progression was generated by another means, the evaluation unit determines by what value and in which direction the progression of the sensor signal and the progression of the reference signal must be displaced relative to each other in order to attain congruence between the sensor signal in the reference signal, and the position in which the element is located when the progression of the sensor signal is generated, is determined from the value and the direction and the reference position.

The sensor signal of the method according to the invention and of the devices according to the invention is particularly a signal that with an X-axis describing the measurement path or proportional to the measurement path, has a signal value at each value of the X-axis. The sensor signal, or the intermediate signal, can also be a table in which signal values, or intermediate signal values are assigned to X values.

Methods are known from the prior art, for example from the document EP 1 209 439 B1, which, for example, build upon the fundamental idea to select the signals from two sensors in proximity to the element, and to determine a position value by extrapolating or interpolating the two sensor signals, wherein EP 1 209 439 B1 describes an additional possible correction to the fundamental principle. Such a method can be performed with the devices according to the invention. However, such a method requires that the same element magnet always be used. If different element magnets are used however, for example if only one model of the device according to the invention for generating a sensor signal is produced, which is intended for use with as many different element magnets as possible, then it is to be anticipated that only a rough determination of the position is possible using the methods known from the prior art. The position of the element can be better determined using the method according to the invention. In particular, the method according to the invention enables the device for generating a sensor signal to be used with different magnetic field-generating elements, because the evaluation unit contains a parameterized reference progression that expresses the progression of a sensor signal generated with the device, which was generated when the device was located in a known reference position relative to the device, or which was generated by another means, for instance, by simulation. Simulation in particular offers another means for generating the reference progression, the result of which is the anticipated progression of the signal sensor if the magnetic field-generating element is located in a reference position relative to device for generating a sensor signal. Likewise, another means can be the transfer of the reference progression that was determined from another device, particular preferably from another structurally identical device.

Thus with the method according to the invention, after placement at the operating site, a one-time calibration procedure can be performed in which the progression of the sensor signal is determined as the reference progression from the signals generated by the sensors, for example from the intermediate signals. In doing so, the reference progression stored in the evaluation unit ahead of time can be smoothed by using typical signal processing methods. In the measuring operation, the reference progression with the preferred embodiment can then be displaced computationally so that the progression of the sensor signal determined during operation coincides as best as possible with this reference progression. An exact position value can be determined from the parameters required for the displacement of the reference progression.

The progression of the sensor signal, or of the reference progression are particularly preferably stored in tables or the like, in which the respective value of the reference progression, or of the progression of the sensor signal at this value of the X-coordinate is stored for values of the X-coordinate. The numbers of X values provided in the table and the distance of the individual values of the X-coordinate to each other can be adapted to the measurement requirements. It is particularly preferable if the values of the X-coordinate stored in the table are uniformly spaced, and particularly preferably the distance between them is substantially smaller than the centers of the sensors are distanced from each other in the direction of the measurement path.

In a particularly preferred embodiment, the sensors generate analog intermediate signals that are digitized into digital intermediate signals, wherein the sensor signal is generated from the digital intermediate signals. It is thereby possible to attain improved signal processing.

In a preferred embodiment, linearity deviations of sensor characteristic curves originating both from the sensor principle, as well as manufacturing dependent deviations of sensor alignment and support field directions, are compensated.

In a preferred embodiment, input signals are used for generating the sensor signals and these input signals are generated on the basis of intermediate signals, wherein nonlinearities and/or temperature dependencies of the sensors and/or the A/D converters are corrected during the generation of the input signals. This can be attained in the scope of a one-time factory calibration, in that the characteristic curve of each individual sensor is measured with several magnetic field strengths, and is stored in table form or in the form of characteristic parameters of the characteristic curves in non-volatile memory, and the temperature behavior of the sensors is measured at at least two different temperatures and likewise is stored in a suitable form.

In a preferred embodiment, the digitized sensor signals are corrected, taking into consideration the shape of the reference progression, before the signals are further evaluated. The digitized sensor signals can be corrected before the further evaluation thereof taking into consideration the actual temperature during the measurement, the temperature behavior of the sensor characteristic curve, particularly the temperature behavior of the sensor amplitude and the offset.

In a preferred embodiment the evaluation unit, which determines the position of the element from the sensor signals, is placed on the same printed circuit board as the sensors.

In a preferred embodiment, a further evaluation unit is located in the connecting line, or the connecting plug, or in a housing of the device, that with use of the position information available from the sensor arrangement and the evaluation unit thereof based on previously defined switch positions, triggers digital switching procedures and/or provides the switching states via a suitable interface.

In a preferred embodiment, the element is an annular permanent magnet or a cylindrical permanent magnet. Annular permanent magnets are frequently used as an element particularly in the case of pistons.

In one preferred embodiment, the element is a part of the piston and the device for generating a sensor signal is a part of the piston housing. In an alternative, also preferred embodiment, the element is a part of a valve body and the device for generating a sensor signal is a part of a valve housing in a valve disc.

BRIEF DESCRIPTION OF THE DRAWINGS

The invention is explained in the following in more detail based on a drawing representing one example embodiment. Shown are:

FIG. 4a, b a schematic representation of a sensor of the device according to the invention together with a magnetic field-generating element, FIG. 5 a perspective view of a sensor according to the invention in a housing together with a magnetic field-generating element;

DETAILED DESCRIPTION

Figure 1:
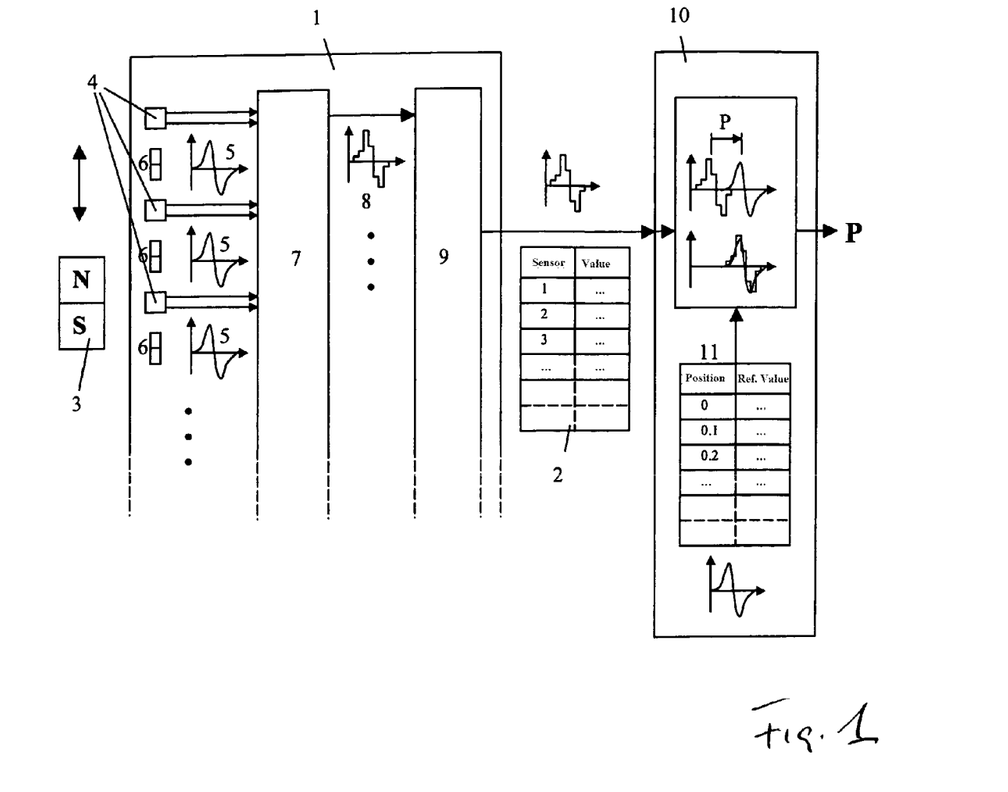
FIG. 1 a sketched representation of the device according to the invention having a magnetic field-generating element and a device for generating a sensor signal.

FIG. 1 shows a device for generating a sensor signal 1, the progression 2 of which, shown as table 2, depends on the position of a magnetic field-generating element 3 relative to the device 1. The device 1 has a plurality of magnetically sensitive sensors 4 (the representation according to FIG. 1 shows three sensors of the plurality). The sensors 4 are disposed along a measurement path pointing linearly from top to bottom in the representation of FIG. 1. The magnetically sensitive sensors generate intermediate signals 5.

The device 1 shown in FIG. 1 has a support field device, which generates in the magnetically sensitive sensors 4 a magnetic support field that has at least in the magnetically sensitive sensors a substantially identical direction and essentially homogeneous field strength.

Figure 3:
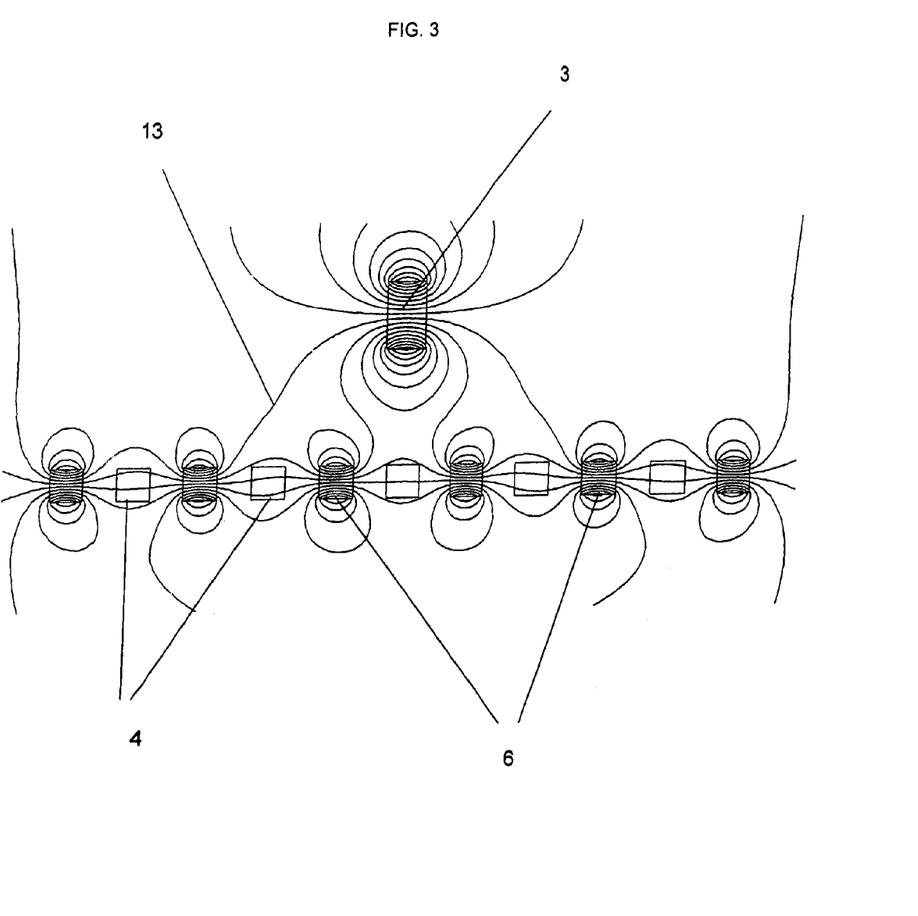
FIG. 3 a schematic representation of the magnetic field acting on a sensor of a device according to the invention.

FIG. 3 shows the magnetic field acting on the sensors 4, and the magnetic field lines 13 that are influenced by the support field generated by the permanent magnets 6 of the support device and by the magnetic field generated by the magnetic field-generating element 3 overlapping the support field.

The support field device is formed by a multiplicity of permanent magnets 6. As shown in FIG. 1, the sensors each have a part which generates an intermediate signal, wherein the progression of the intermediate signal depends on the direction and/or the strength of the magnetic field generated by the element 3.

Figure 8A:
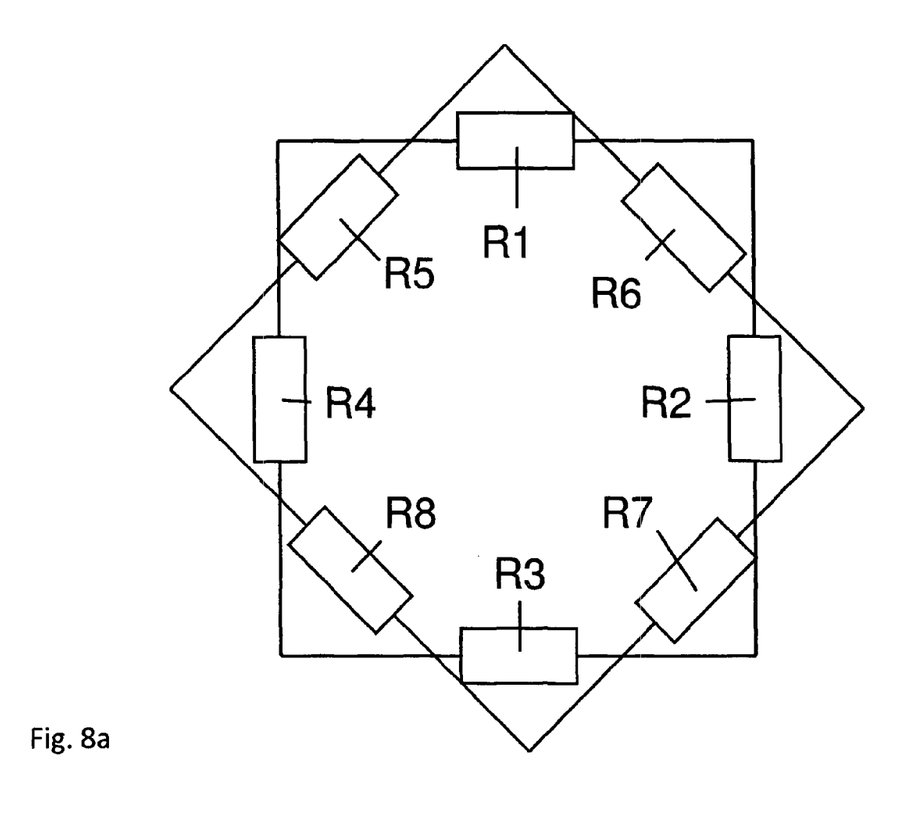

In a further embodiment, the support field device is formed by a multiplicity of permanent magnets 6. As shown in FIG. 8a, the respective sensor has a first part (resistors R1, R2, R3, R4) that generates a first intermediate signal, and a second part (resistors R5, R6, R7, R8) that generates a second intermediate signal, wherein the progression of the first intermediate signal and the progression of the second intermediate signal depend on the direction and/or the strength of the magnetic field generated by the element 3. The first intermediate signal has a substantially sinusoidal progression (see FIG. 8b) for the applied voltage U sin). The second intermediate signal has a substantially cosinusoidal progression (see FIG. 8b) for the applied voltage U cos). As seen in FIG. 8a, the center of the first part corresponds to the center of the second part.

Figure 8B:
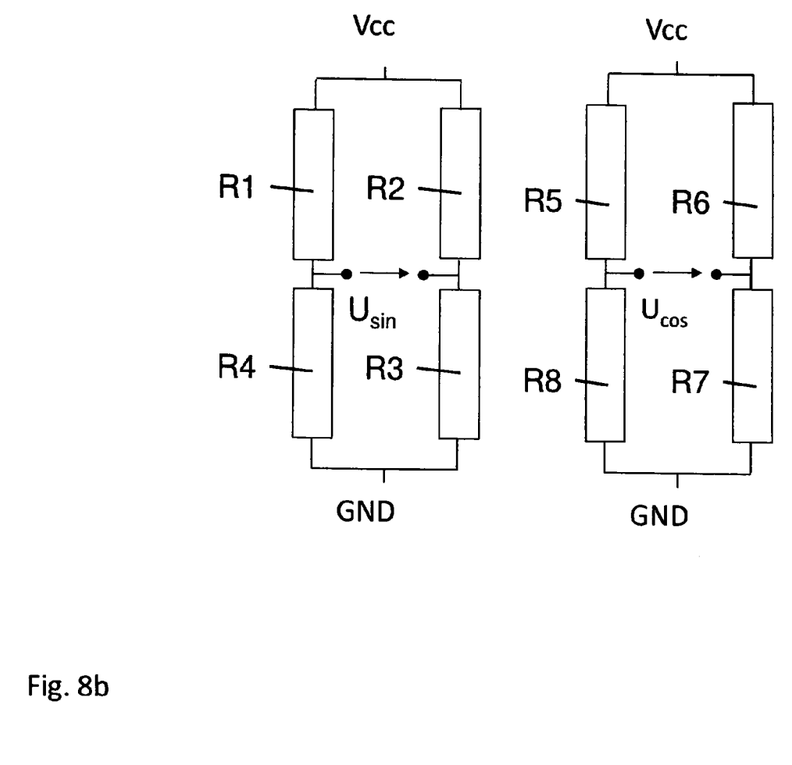

The sinusoidal and cosinusoidal signals of the sensors 4 can be used to determine the progression of the field direction. The field angle is given in a simple manner by the calculating the arctangent of the quotient of the two signals. (field angle=0.5*ARCTAN(Ua sin/Ua cos)). This embodiment offers the advantage, for example, that by using the relationship Ua sin*Ua sin+Ua cos*Ua cos=constant, each individual sensor can be checked to determine if the sensor signal is correct. In the case of weak element fields, the support field guarantees this condition is maintained. In the case of strong element fields the support field can be omitted. A disadvantage however is the increased cost of electronics and computation expense.

In the case of this variant, however, the field angle does not need to be determined—both signals can be used and evaluated independently of each other, for example, analogous to the next method described in detail. Thus, the number of measurement points can be doubled with the same construction size. However, one can also choose to evaluate only one of the two signals per sensor, analogous to the next method described in detail, which however requires strong element field strengths.

As shown in FIG. 1, the intermediate signals 5 generated by the sensors 4 are supplied to a unit 7 in which the digital intermediate signals 8 are generated from the analog intermediate signals 5, wherein while the digital intermediate signals are generated non-linearities and temperature dependencies of the sensors and the A/D converters provided in the unit 7 are also corrected. The analog intermediate signals can also be supplied to a unit 7 via a multiplexer.

Then, the sensor signal 2 is generated in the unit 9 from the digital intermediate signals 8 (input signals). The sensor signals can be represented as a table, which assigns a measurement value for the present position of the element 3 to each sensor 4. The position of the sensors 4 along the linear measurement path is already known such that the table-like representation in which a measurement value is assigned to the respective sensor, is equal to the representation of a signal progression in which the progression of measurement values is represented along a linear X-coordinate (the measurement path).

Figure 2:
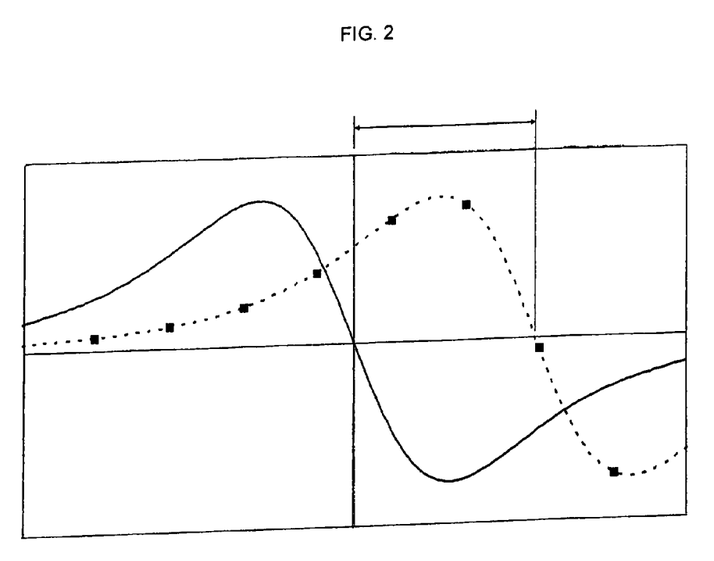
FIG. 2 a graphical representation of the signal sensor and the reference signal.

The sensor signal 2 is supplied to an evaluation unit 10. The progression of the signal that is generated when the element is located in the position to be determined, is compared in the evaluation unit 10 with a reference progression 11 stored in the evaluation unit 10, wherein the reference progression of the progression represents a sensor signal generated with the device, that was generated when the element 3 was located in a known reference position relative to the device. In the evaluation unit—as represented in FIG. 2—it is determined by what amount and in which direction the progression of the sensor signal and the progression of the reference signal must be displaced relative to each other in order to attain congruence between the reference signal and a sensor signal. The position of the element, at which it is located when the progression of the sensor signal is generated, is determined from the amount and the direction and the reference position.

The graph represented in FIG. 2 shows the content of the table-like sensor progression 2 and the table-like reference progression 11 as an example. FIG. 2 shows the values in the sensor progression stored as points for the respective sensors. The reference values are shown in the graph of FIG. 2 as a solid line. It can be seen that the measured sensor progression is displaced toward the left by somewhat more than two sensors. If the reference progression is mathematically displaced onto the sensor progression (or the sensor progression onto the reference progression—which yields the same information as a result) then the amount by which the respective progression must be displaced and in which direction it must be displaced can be determined. In addition to the reference progression, it is known in which position the element 3 is located when the reference progression was recorded. With the information of the amount and the direction, thus, from the mathematical displacement of progressions, it can be determined by what amount and in which direction the element is located at the point in time of the generation of the sensor progression, relative to the position in which the reference progression was recorded. Thus, the exact position of the element 3 at the point in time of recording the sensor progression can be determined.

Figure 4:
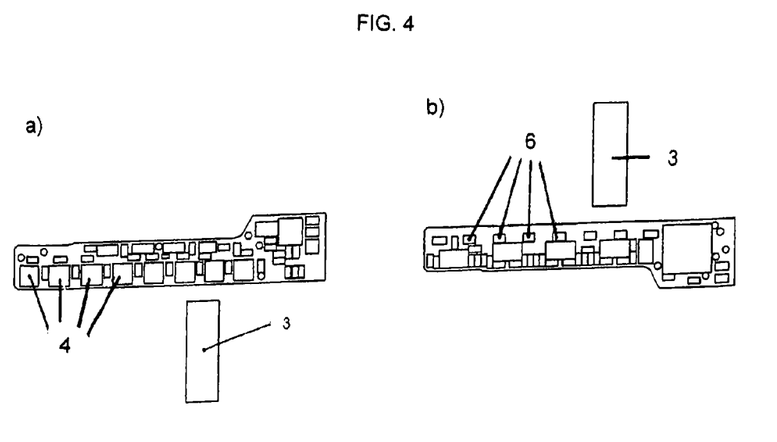

FIGS. 4*a*, *b* represent the front side and the back side of a device according to the invention having sensors 4, which are disposed on a base plate. Here, FIG. 4*a* represents a view of the front side of a device according to the invention, and FIG. 4*b* represents a view of the back side of the same device according to the invention. The permanent magnets 6 of the support field device can be seen in FIG. 4*b*. In addition, the element magnet 3 is shown in the FIGS. 4*a* and 4*b*.

Figure 5:
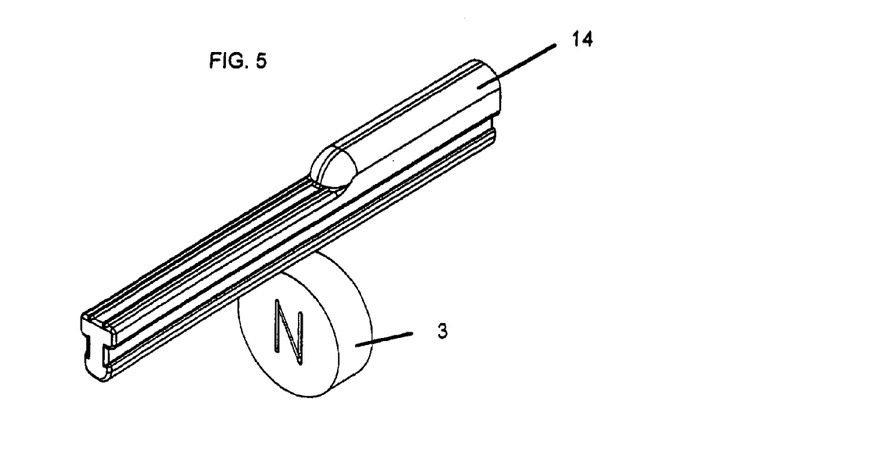

FIG. 5 shows a device according to the invention with a housing 14. The base plate with the elements carried thereupon, as can be seen for example in FIGS. 4*a* and 4*b*, are disposed in the housing 14. In addition, the element magnet 3 is placed across from the housing 14. The housing 14 has a design which allows the housing to be slid into a groove.

Figure 6:
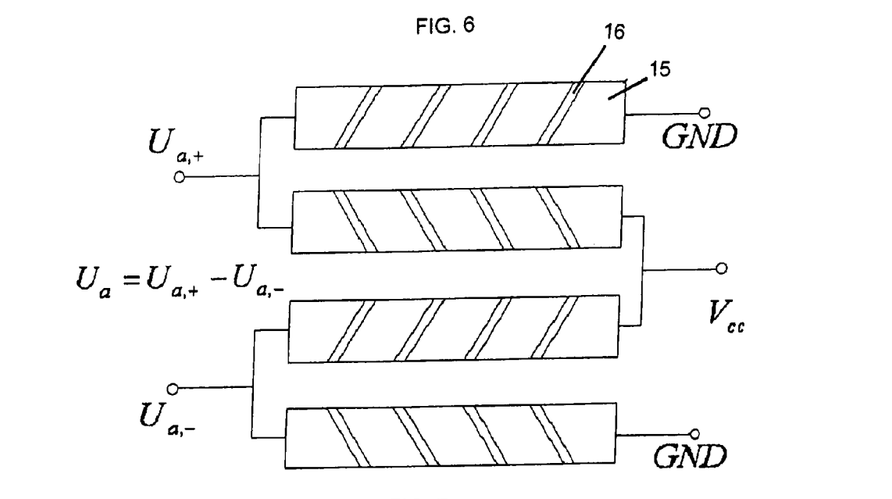
FIG. 6 a barber pole sensor, as it can be used in conjunction with the sensor of the device according to the invention, FIG. 7 the arrangement of such a barber pole sensor relative to a magnetic field-generating element, and FIGS. 8a, b a schematic representation of a sensor; as it can be used with the device according to the invention.

A barber pole sensor is represented in FIG. 6. This barber pole sensor is composed of 4 magnetoresistive resistors 15, which are disposed on the so-called "barber pole" 16.

Figure 7:
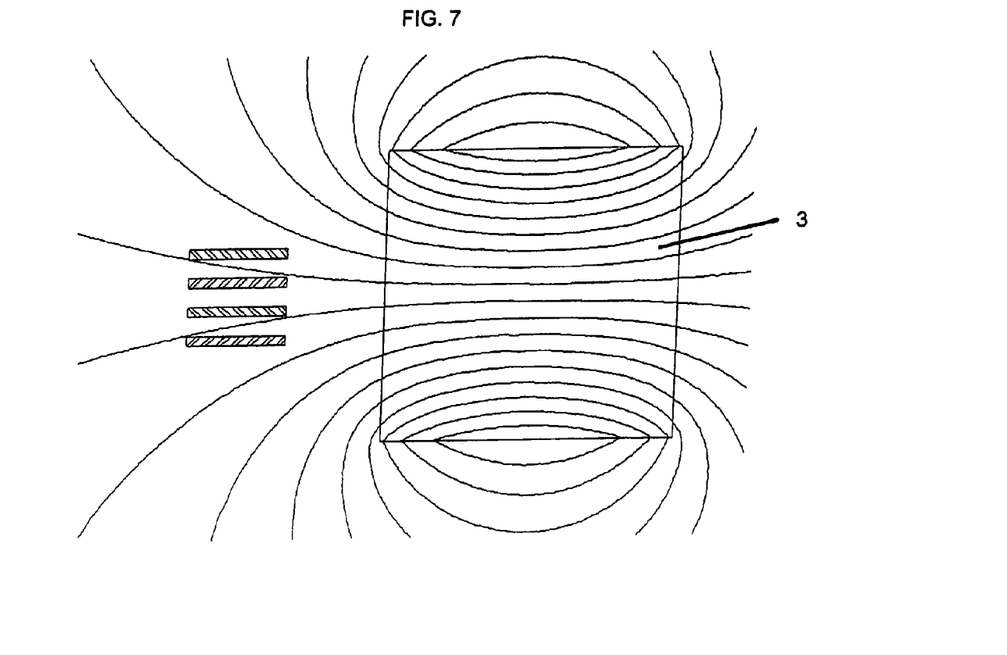

FIG. 7 shows the arrangement of the barber pole sensor, represented in FIG. 6, in the magnetic field of a element magnet 3.

What is claimed is:

1. A device for generating a sensor signal, the progression of which depends on the position of a magnetic field-generating element relative to the device, comprising:
at least two magnetic field-sensitive sensors, disposed along a measurement path, that generate the sensor signal or an intermediate signal produced for generating the sensor signal, or several intermediate signals used for generating the sensor signal,
wherein a support field device generates in the magnetic field-sensitive sensors a magnetic support field which at least in the magnetic field-sensitive sensors has an essentially identical direction and an essentially homogeneous field strength, and
wherein the at least two magnetic field-sensitive sensors have a first part which generates a first intermediate signal, and has a second part which generates a second intermediate signal, wherein the progression of the first intermediate signal and the progression of the second intermediate signal depend on the direction and/or the strength of an externally generated magnetic field, and the first intermediate signal has a substantially sinusoidal progression and the second intermediate signal has a substantially cosinusoidal progression, and the center of the first part corresponds substantially to the center of the second part.

2. The device of claim 1, wherein the magnetic field-generating element is movable relative to the device for generating a sensor signal along a path that runs substantially parallel to the measurement path, and
wherein
at least one sensor having a progression of the characteristic curve, with respect to a magnetic field component of a magnetic field applied externally to the sensor without influence of the support field, that for each field strength of the magnetic field component expresses a value of the ratio of the strength of the sensor signal generated by the sensor relative to the maximum sensor signal that can be generated by the sensor, and that in a field strength range of the magnetic field component the progression is substantially linear, and progresses non-linearly adjacent to the section of the characteristic curve running substantially linearly,
the magnetic field generated by the element, when the element is located at a position along the path in which the element is closest to the sensor, and no support field is present, has a magnetic field component in the sensor with a first field strength that lies outside of the field strength range in which the characteristic curve has a substantially linear region, and
the sensor, with respect to a magnetic field component of a magnetic field applied externally to the sensor with the influence of the support field, has a different progression of the characteristic curve, that in a field strength range of the magnetic field component is substantially linear and progresses non-linearly adjacent to the section running substantially linearly,
the magnetic field generated by the element, when the element is located at a position along the path in which the element is closest to the sensor, and the support field is present, has a magnetic field component in the sensor with a first field strength that lies within the field strength range in which the other progression of the characteristic curve has a substantially linear region.

3. The device according to claim 1, wherein the measurement path is a line or an elliptical arc or a cylindrical surface or a hyperbolic surface.

4. The device according to claim 3, wherein the sensors and the support field device are fastened to a carrier element for forming a sensor head, and the dimensions of the sensor head are less than 150 mm in the direction of the measurement path and less than 2.4 mm in a first direction perpendicular to the measurement path and less than 10 mm in a second direction that is perpendicular to the measurement path and perpendicular to the first direction.

5. The device according to claim 1, wherein the magnetic field-sensitive sensors are magnetoresistive sensors.

6. The device according to claim 1, wherein the element is an annular permanent magnet or a cylindrical permanent magnet.

7. The device according to claim 1, the element is part of a piston, and the device for generating a sensor signal is part of a piston housing, or that the element part is a valve body and the device for generating a sensor signal is part of a valve housing.

8. The device according to claim 1, further comprising: a housing, configured for sliding into grooves of positioning devices and that in the region of the sensors projects out of the groove only to a small extent, or even not at all, wherein a projection serving also as an assembly handle can project substantially out of the groove only in the region of the cable connection.

9. A method for determining the position of a magnetic field-generating element relative to a device for generating a sensor signal, having at least two magnetic field-sensitive sensors disposed along a measurement path, which generate the sensor signal or an intermediate signal used for generating the sensor signal or several intermediate signals used for generating the sensor signal, comprising the steps of:

comparing by an evaluation unit, the progression of the sensor signal that is generated when the element is located in the position to be determined to a reference signal progression stored in the evaluation unit, wherein the reference signal progression expresses the progression of a sensor signal generated with the device, that was generated when the element was located in a reference position relative to the device, or the reference progression was generated by another means, determining by the evaluation unit by what value and in which direction the progression of the sensor signal and the progression of the reference signal must be displaced relative to each other in order to attain congruence between the sensor signal and the reference signal, and determining by the evaluation unit, the position in which the element is located when the progression of the sensor signal is generated, from the determined value and the direction.

10. The method according to claim 9, further comprising the step of:

generating by the sensors, analog intermediate signals that are digitized into digital intermediate signals, and generating the sensor signal from the digital intermediate signals.

11. The method according to claim 10, wherein for generating the sensor signal, input signals are used that are generated based on the digital intermediate signals, and that non-linearities and/or temperature dependencies of the sensors and/or of analog to digital (ND) converters are corrected during the generation of the input signals.

12. The method according to claim 9, wherein the sensor signal and/or the intermediate signals are generated with the device for generating the sensor signal.

* * * * *